(12) United States Patent
Vaz Camara (10) Patent No.: US 11,457,637 B2
(45) Date of Patent: Oct. 4, 2022

(54) ELECTROMECHANICAL NIXTAMALISATION SYSTEM

(71) Applicant: Eloy Vaz Camara, Mexico City (MX)

(72) Inventor: Eloy Vaz Camara, Mexico City (MX)

( * ) Notice: Subject to any disclaimer, the term of this patent is extended or adjusted under 35 U.S.C. 154(b) by 542 days.

(21) Appl. No.: 16/329,590

(22) PCT Filed: Aug. 25, 2017

(86) PCT No.: PCT/IB2017/055133
§ 371 (c)(1),
(2) Date: Feb. 28, 2019

(87) PCT Pub. No.: WO2018/042301
PCT Pub. Date: Mar. 8, 2018

(65) Prior Publication Data
US 2019/0193083 A1    Jun. 27, 2019

(30) Foreign Application Priority Data
Aug. 29, 2016 (MX) .................... MX/a/2016/011214

(51) Int. Cl.
*A21D 6/00* (2006.01)
*B02B 1/04* (2006.01)
(Continued)

(52) U.S. Cl.
CPC ............. *A21D 6/003* (2013.01); *B01F 29/62* (2022.01); *B02B 1/04* (2013.01); *B02B 1/06* (2013.01); *A23L 7/1975* (2016.08); *B01J 8/10* (2013.01)

(58) Field of Classification Search
CPC ..... B02B 1/04; B02B 1/06; B02B 1/08; B01F 29/62; B01F 35/7548; A21D 6/003;
(Continued)

(56) References Cited

U.S. PATENT DOCUMENTS

| 2,231,856 A | * | 2/1941 | Wetter ................... F25B 39/04 |
| | | | 165/282 |
| 2,704,257 A | | 3/1955 | Sollano et al. |

(Continued)

FOREIGN PATENT DOCUMENTS

| GB | 1238725 A | 7/1971 |
| JP | 2003340293 A | 12/2003 |
| WO | 2014027335 A2 | 2/2014 |

OTHER PUBLICATIONS

International Search Report and Written Opinion issued for International Application No. PCT/IB2017/055133 dated Jan. 17, 2018, 9 pages.

*Primary Examiner* — Gabriel E Gitman
(74) *Attorney, Agent, or Firm* — Rothwell, Figg, Ernst & Manbeck, P.C.

(57) ABSTRACT

An electromechanical nixtamalization system comprises a vertical cylindrical reactor formed by an inside container with an insulating layer, an end in the shape of a truncated cone, in which the material inlet and outlet reactor cover is provided. A reactor resistor is arranged inside the reactor and can be removed from the reactor through a resistor cover to which it is attached by one of the ends thereof, the cover being accessible from the outside through the wider end of the reactor, which is exactly opposite to the end in the shape of a truncated cone in which the material inlet and outlet is located. The reactor rotates in an oscillating manner about a horizontal rotation shaft attached to a base or structure along with bearings. A compressor introduces pressure through a pressure inlet valve located inside the reactor and a water tank located above the reactor is in communication with a lime container and in turn feeds the reactor through a valve. The gasses generated inside the reactor are used to heat the water reservoir.

13 Claims, 5 Drawing Sheets

(51) Int. Cl.
  *B02B 1/08* (2006.01)
  *B01F 29/62* (2022.01)
  *B02B 1/06* (2006.01)
  *A23L 7/10* (2016.01)
  *B01J 8/10* (2006.01)

(58) Field of Classification Search
  CPC ......... A21D 2/02; A23L 7/1975; A23L 7/198; B01J 8/10; A23B 9/005
  See application file for complete search history.

(56) References Cited

U.S. PATENT DOCUMENTS

| | | |
|---|---|---|
| 3,117,868 A | 1/1964 | Madrazo et al. |
| 2015/0296844 A1* | 10/2015 | Vaz Camara ............. B02B 1/04 99/358 |

\* cited by examiner

ELECTROMECHANICAL NIXTAMALISATION SYSTEM

CROSS-REFERENCE TO RELATED APPLICATIONS

This application is a 35 U.S.C. § 371 National Phase Entry Application from PCT/IB2017/055133, filed on Aug. 25, 2017, and designating the United States, which claims the benefit of priority to Mexican Patent Application No. MX/a/2016/011214 filed on Aug. 29, 2016. The disclosures of both the foregoing applications are incorporated herein by reference in their entirety.

FIELD OF THE INVENTION

The present invention relates to an electromechanical nixtamalization system comprising at least one reactor that rotates 180 degrees in a reciprocating movement, which can be defined as oscillating, a water supply system, a pressure supply system and a movement system. More particularly, the present invention refers to a nixtamalization system which comprises a 180-degree rotating reactor which homogeneously cooks the kernels with pressure and heat wherein there is an internal resistor in the central part of the reactor for heating the material inside. Still more particularly, the present invention relates to a nixtamalization system comprising an upper water supply tank which heats the water by means of a resistor and by means of the steam/pressure that is generated in the cooking of the kernel of a previous batch, a geared motor, 180 degree rotating reactor with a cover which comprises a deflector cap to prevent the beans from spreading when the reactor is emptied. Therefore, there is an energy saving in the generating the nixtamal and wherein the nixtamal is ready for its grinding with a higher energy saving, in a reduced time and without discharges of wastewater.

BACKGROUNDS OF THE INVENTION

The nixtamal has been the basis for the manufacture of the dough from which by-products are derived, as it is known, the corn has been the basis of the food of the Mexicans, to obtain the dough it is necessary to cook the corn kernels which are partially dried, for such ends, they are traditionally placed in large cooking pots to add water and lime wherein the percentage of lime exceeds 2% for then cooking them for a certain period of time, after that cooking time they are cooled in cooling tubs wherein at the same time they are rinsed and drained, so there is a considerable amount of highly polluting wastewater; once cooled and washed, the kernels go to the grinding, this traditional method for cooking the kernels has been sufficient to provide the dough to the tortilla factories, however, to maximize the profits, the traditional mills make use of pots and tubs which are maintained in unhealthy conditions, this, due to several factors that occur during the cooking of the nixtamal, this is, for example, that the cleaning of the pots, as they are of a considerable size, is not good enough to eliminate the germs and bacteria that accumulate with the day to day of the nixtamalization process. Another highly unhealthy factor in the generation of nejayote (cooking water) which comprises lignin (a polymer that is present in the cell walls of the corn kernel) and comprises a basic PH nature, which is highly polluting, and which is poured into the drain as it is a waste product without any purpose. Traditionally, in order to have a homogeneous cooking of the corn kernels in the nixtamal mills, large amounts of water with more than 2% lime are introduced (base of nixtamalization) to obtain a nixtamal with good characteristics, this only increases the amount of nejayote that is poured into the drain. Now then, the lack of control in the mills has resulted in the same being an industry that manages to speculate with the price and quality of the corn and, therefore, the price of the dough and the price of tortillas, this has resulted in the fact that the prices do not lower, while the quality of the dough decreases and not to mention the hygienic conditions of the dough.

The prior art shows several reactors for cooking corn. In this regard, patent application MX/a/2013/009475 of the same inventor hereof explains an electromechanical nixtamalization system comprising a rotating reactor that rotates about a horizontal shaft comprising an internal one piece steel container that does comprise internal vanes, resistors are provided on the outside of the cylinder, a ceramic fiber layer and a stainless steel demountable jacket, an upper receiving hopper that introduces kernels of corn into the reactor; a cooling tub with cover, the cooling tub has an inner wall, a middle wall and a cooling chamber between the inner wall and the middle wall and a high pressure polyurethane foam shell; the invention disclosed in that application of the same inventor is highly effective in the cooking of corn kernels, however it did not comprise energy savings and the cooking times, although they were fast, could not be improved by itself. The maintenance was slow in case of needing it and it was not adapted so that a common user as the one in charge of the tortilla factory could use it without an adequate training. The water was provided in a raw way to the system, so the energy loss was mean.

Patent MX292580 is related to the tortilla industry, and any new industry in which the nixtamalization of any product is required, is more specifically related to a nixtamalization process with a rotating reactor, and which comprises a step of conditioning the kernel prior to letting it stand and after removing the kernel from the reactor, said conditioning consists in passing the kernel through a determined amount of water to provide absorbed water to the kernel. Although the invention speaks of a rotating reactor, this does not define the technical characteristics of said reactor, it uses steam for the hydration of the kernel to condition the kernel and thereafter pass it to the cooking, this type of conditioning requires a large amount of energy and water to generate the steam and therefore the generation of pollutants is greater. Thus, the energy saving is null in said patent. Moreover, the machine may not be used by any person.

Most of the rotatory or semi-rotatory reactors of the prior art are concrete mixers-type pots which rotate laterally, and which need a series of internal blades to move the contents; in other cases, they are pots that carry out their heating from the outside and do not comprise a previous water treatment with the same energy that is in the reactor from a previous batch. This type of pots has the disadvantage of losing the heat that is necessary for the nixtamalization process in the pot itself or in the environment, which results in an energetically speaking inefficient system.

The systems for obtaining nixtamal are considered for large industries where the quantity of product to be cooked is very large and therefore, alternate processes are needed for cooking the corn, such as changes in temperature or the introduction of water steam or other substances to help in the hydration of the corn kernel; in the present invention, the disadvantages of cooking for small nixtamal producers are solved, where the system is safe and simple to use due to its few pieces.

In order to understand the nature of nixtamal it is necessary to note that it is prepared according to a Mesoamerican technique: corn is cooked in water with a fixed lime ratio (calcium hydroxide), commonly three parts of water per one of lime, although the lime contents may increase if the kernels are very hard. Once cooked, the kernel is allowed to stand preferably overnight, however this standing time can be avoided depending on the cooking, the time it takes to pop, and the corn hull is separated to facilitate grinding, at the same time the kernel is hydrated to avoid the characteristic hardness of corn kernels. Based on this principle, the nixtamalization carries out a series of by-products which, although they have tried to be avoided, this has not been possible until now.

There are a series of needs to obtain the nixtamal in the market. In the first place, it would be desirable for the nixtamal to be near the tortilla factories, and even more preferable it would be for the tortilla factories or places where the nixtamal is used to comprise a safe system, which provides the nixtamal for grinding thereof, that the system occupies a small space, eliminates the amount of nejayote that is transferred to the drain, that the system saves energy and, above all, that the system may be easily and simply operated by a common operator without the need for extensive knowledge. This would provide for each entity that uses the nixtamal to be able to improve the quality of its products by removing the intermediary (mills) which can offer the nixtamal and the by-products at the price they consider appropriate. The skilled technicians in the art know that, traditionally, the millers produce the nixtamal to grind it and then transport it to the tortilla factories, however the product has an approximate degradation time of 9 hours, so if it is not used in that period of time there is a production waste which has a direct impact on the cost of the product for sale to the consumer. The above also proposes a disadvantage for the tortilla marketers as they cannot store dough for a subsequent day, so they depend on the times of the miller. Also, when depending on the millers, the tortilla marketers may not choose the quality of the dough or the corn from which the tortillas are made, much less they have an influence on the cleanliness of the process.

Another disadvantage in terms of the transportation of the nixtamal and dough is the pollution received in that process, which is reflected to the final consumers.

OBJECTIVES AND ADVANTAGES OF THE INVENTION

The object of the present invention is to provide an electromechanical nixtamalization system which comprises a 180 degrees rotary reactor on a horizontal shaft having an oscillating movement by means of pulleys, belt and a geared motor.

A second objective of the present invention is to provide an electromechanical nixtamalization system wherein the 180 degree rotating reactor that rotates about a horizontal shaft comprises a stainless steel, food grade aluminum, or steel with ceramic coating or one piece hard Teflon inside container, same comprises a resistor in the central part that homogeneously heats the corn with the water with lime and which may be easily changed in case of resistor failure.

A third objective of the present invention is to provide an electromechanical nixtamalization system wherein the reactor further comprises a cover at one of the ends of the reactor which allows the filling and emptying thereof which is quickly opened by means of a closing lever.

A fourth objective of the present invention is to provide an electromechanical nixtamalization system comprising a reactor that allows the tortilla factories to elaborate their own nixtamal in situ for grinding thereof, due to the absence of residual discharges (nejayote).

A fifth objective of the present invention is to provide an electromechanical nixtamalization system which advantageously has a water tank which provides hot water by means of the same steam and by means of a resistor to accelerate the process.

A sixth objective of the present invention is to provide an electromechanical nixtamalization system comprising a water inlet with calcium hydroxide and a pressure inlet for its easy preparation, so that nixtamal batches are obtained faster.

A seventh objective of the present invention is to provide an electromechanical nixtamalization system comprising a steam outlet that goes to the water tank to heat the water in the water tank and thereby save energy.

An eighth objective of the present invention is to provide a cover with gasket that is sealed by means of a lever and a cover latch which hermetically seal the reactor and at the same time can be opened quickly to be able to remove the nixtamal quickly.

A ninth objective of the present invention is to provide an electromechanical nixtamalization system comprising a reactor resistor cover with which the resistor can be accessed and changed rapidly in case of failure.

A tenth objective of the present invention is to provide an electromechanical nixtamalization system having a control board comprising the elements and electrical protections needed to operate the system.

An eleventh objective of the present invention is to provide an electromechanical nixtamalization system having a water level to be able to see if there is water before beginning the nixtamalization process.

BRIEF DESCRIPTION OF THE DRAWINGS OR FIGURES

A preferred embodiment of the electromechanical nixtamalization system according to the invention will be described below supported by the following.

DETAILED DESCRIPTION OF THE INVENTION

In the present invention an electromechanical nixtamalization system is detailed. It is worth mentioning that the present disclosure refers to a series of elements that work together to obtain a finished product (nixtamal) by means of batches of corn kernels that are cooked resulting in a nixtamal ready for grinding in a continuous and batch process perfectly manageable by unqualified personnel.

The present detailed description refers to a series of elements which are comprising the electromechanical nixtamalization system, however, some elements may be replaced due to the characteristics of the place where the system will be installed. Notwithstanding the above, the present disclosure is detailed in all of its parts for a better understanding where the advantages of the assembly have been added.

The electromechanical nixtamalization system then comprises a series of advantages that each and every one of the elements provide, so it is not necessary for the nixtamal to let it stand or store and its cooking is faster and more homogeneous, resulting in a production preferably of 25 Kg per load, so this system is ideal for the popular tortilla factories, the advantage of being able to make the nixtamal directly in the tortilla factories is to only have the nixtamal that is needed for the day of work, the freshness of the product when being made in situ, avoiding residual discharges to the drain as the reactor only needs the water needed to hydrate the corn kernels, using the cooking steam to heat the water that is in a water tank that will be used in the next load and especially that the tortilla marketer may choose the features of the corn kernels from which to elaborate the tortillas so the quality of the final product gives him an advantage against his competitors; in an alternative embodiment, the electromechanical nixtamalization system may be larger for industrial production.

Figure 1:
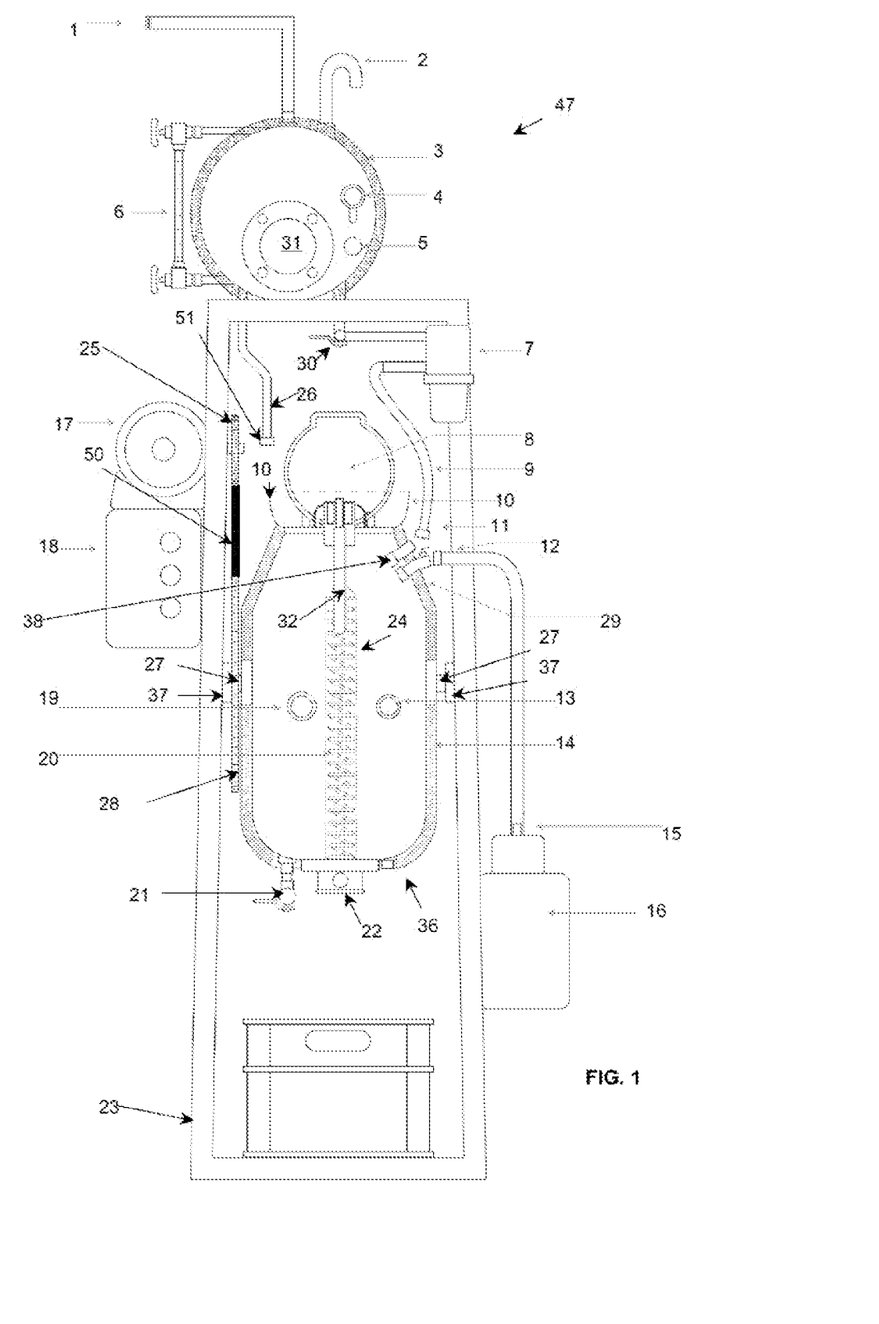
FIG. 1 shows the electromechanical nixtamalization system of the present invention in the filling mode.

FIG. 1 shows the electromechanical nixtamalization system of the present invention in the filling mode, the operating base of the present invention is related to a reactor (36). The reactor body (36) is substantially cylindrical with a mouthpiece of smaller diameter which corresponds to the outlet or intake of product, the opposite end comprises reactor resistor cover (22).

The reactor (36) is comprised by a stainless steel, food-grade aluminum, or steel with ceramic coating or one piece hard Teflon inside container; a reactor insulation layer (14) which isolates the reactor (36) thus avoiding heat losses, the material of the reactor insulation layer (14) may be, but is not limited to, of fiberglass, mineral wool, expanded polystyrene, extruded polystyrene, phenolic resin foam, among others; a structure layer is optionally provided on the outside for the reactor (36) to have a greater strength and keep the insulator protected. It should be mentioned that in the present invention it is preferred to have the insulation layer and the structure layer in the reactor, however, only the container layer may be present, this embodiment is feasible, however, the energy saving is lower in this embodiment.

The reactor (36) has a reactor resistor (20) at the opposite end of the outlet mouthpiece which comprises a transfer element (24) or element surrounding the resistor, which has direct contact with the corn, water and lime mixture. The transfer element (24) is part of the reactor resistor (20) and is included as an element that may be changed along with the reactor resistor (20), the foregoing shows that it is possible to replace the resistor due to the fact that this, when handling the heat that will cook the mixture could be damaged, so its change would be fast; the reactor resistor (20) is a resistor to which electricity is administered so it generates the heat necessary for the cooking of corn, in an alternative embodiment the reactor resistor (20) is connected to an electrical circuit (not shown) along with a thermostat (not shown) which is responsible of maintaining the constant temperature inside the reactor.

The reactor resistor (20) which is electrical, is mounted on a base that is attached to a reactor resistor cover (22) which is removably attached to the rest of the reactor (36); advantageously, as the reactor resistor (20) and reactor resistor cover (22) are removable, same may be removably changed in case of failure, where it may be adapted by means of screws, threaded etc.; the reactor resistor assembly (20) and transfer element (24) are attached to the reactor by the means necessary to avoid pressure leaks, this may be with food grade joints or food grade sealers; in the same end of the reactor resistor cover (22) there is provided a steam/pressure outlet valve (21) which comprises a primordial function along with the water tank (47) which will be explained later. The reactor resistor (20) runs from the reactor resistor cover (22) inside the reactor (36) so that the corn, water and lime mixture contacts the resistor inside the reactor and when rotating the reactor, the kernels will be prevented from adhering to the resistor and at the same time the heat will be transferred homogeneously.

Continuing with the reactor (36), in the smaller diameter mouthpiece which corresponds to the outlet or inlet of the product, there is provided a reactor cover (8) which matches the shape of the end of the reactor (36), circular in the case being illustrated, the cover comprises a cover hinge (illustrated in FIG. 5) and wherein the reactor cover (8) is sealable closed by means of a lever (32) using pressure and a gasket. In the tilt of the smaller diameter mouthpiece which corresponds to the outlet or inlet of the product, there is a pressure inlet valve (29) and a calcium hydroxide inlet valve (38) which feed water with lime and air pressure for cooking the corn; the pressure inlet valve (29) and calcium hydroxide inlet valve (38) are preferred above non-return type valves which will only allow the inlet but will avoid the outlet when the system is in operation, i.e., cooking the corn; when the cover (8) is open, the water is introduced, whereas when the cover (8) is closed, the pressure is introduced.

FIG. 1 shows the system in the filling position, wherein the corn is introduced in the smaller diameter mouthpiece which corresponds to the outlet or inlet of product while connecting the calcium hydroxide hose (9) along with the calcium hydroxide connector (11) to the calcium hydroxide inlet valve (38) to enter the water with lime into the container, the amount of water will depend on the type of corn; in a 25 kg batch of corn an amount of approximately 25 liters of water with 10% lime is introduced, once the reactor cover (8) is closed, pressure is introduced to the reactor (36) by means of a compressor (16), a pressure hose (15) and a pressure connector (12) through the pressure inlet valve (29). The reactor resistor (20) is activated to continue heating and cooking the contents.

The reactor (36) further comprises a thermometer (19) to know the temperature and a manometer (13) to know the conditions of the reactor (36). In order to prevent the corn or nixtamal from being irrigated when the nixtamal is removed, the reactor (36) comprises a deflector cap (10) that will allow the filling and emptying of the reactor (36).

For movement, the reactor (36) comprises a rotation shaft (27) and bearings (37) that are coupled to the reactor base (23); additionally, the rotation shaft (27) comprises a reactor pulley (28) which transfers the movement from the primary pulley (25), the belt (50) and the geared motor (17). The rotation shaft (27) is fixedly attached to the reactor (36), so that the bearings (37) may be changed in case of failure.

The system further comprises a water tank (47) which is operatively attached to the reactor (36) at two moments of the process, in the filling and in the emptying. The water tank (47) is placed in the upper part of the reactor base (23), whereby the supply problem is solved since the water falls by gravity to the reactor (36) without the need for pumps. The water tank (47) comprises a water inlet (1), a water outlet and a pressure inlet; the water tank (47) is comprised by a stainless steel inside container, heat resistant plastic, aluminum, etc.; a water tank insulation layer (3) which isolates the water tank (47) thus avoiding heat loss, the material of the water tank insulation layer (3) may be, but is not limited to, fiber of glass, mineral wool, expanded polystyrene, extruded polystyrene, phenolic resin foam, among others; on the outside there is optionally provided a structure layer to provide a greater strength to the water tank (47) and keep the insulator protected. It is worth mentioning that in the present invention it is preferred that the water tank has the insulation layer and the structure layer, however, only the container layer may be provided, this embodiment is feasible, however the energy saving is lower in this embodiment. The water outlet passes to the water valve (30) and to a lime container (7) and from there it passes to the calcium hydroxide hose (9) along with the calcium hydroxide connector (11) to feed the reactor (36) in the filling, while the pressure inlet coming from the steam/pressure outlet valve (21) consists of a pressure connector (51) and a pressure outlet hose (26) which pass through to the water tank (47). The water tank (47) further comprises a tank thermometer (4) a thermostat (5) which regulates the water tank resistor; a relief siphon (2) is also comprised so that there is no pressure inside the water tank (47). The water inlet to the system is carried out by means of a hydraulic network inlet (1) for filling the water tank (47). Additionally, there is a visual water level (6) which helps to know the amount of water present.

The entire system is controlled by means of a control board (18) which is a system that may have the appropriate controls to perform the necessary cooking and filling times.

FIG. 1 shows the reactor (36) in the loading position, in that step, the smaller diameter mouthpiece which corresponds to the outlet or inlet of product is upstream and comprises the reactor cover (8) which, for the load, is in the open position, first, the corn to be cooked is placed, at the same time it is filled with the 10% lime-water mixture by means of the calcium hydroxide hose (9) and the calcium hydroxide connector (11) with the calcium hydroxide inlet valve (38), once the reactor (8) is filled with the corn and the 10% lime-water mixture, the reactor cover (8) is closed and the reactor resistor (20) is heated and air pressure is introduced by means of a pressure hose (15) and pressure connector (12) through the pressure inlet valve (29) whereby the ideal conditions of cooking corn kernels to generate nixtamal are achieved. The pressure connector (12) and the calcium hydroxide connector (11) are removed so that the reactor (36) begins its approximately 180 degrees rotation to move the contents and thereby have a homogeneous cooking.

Figure 2:
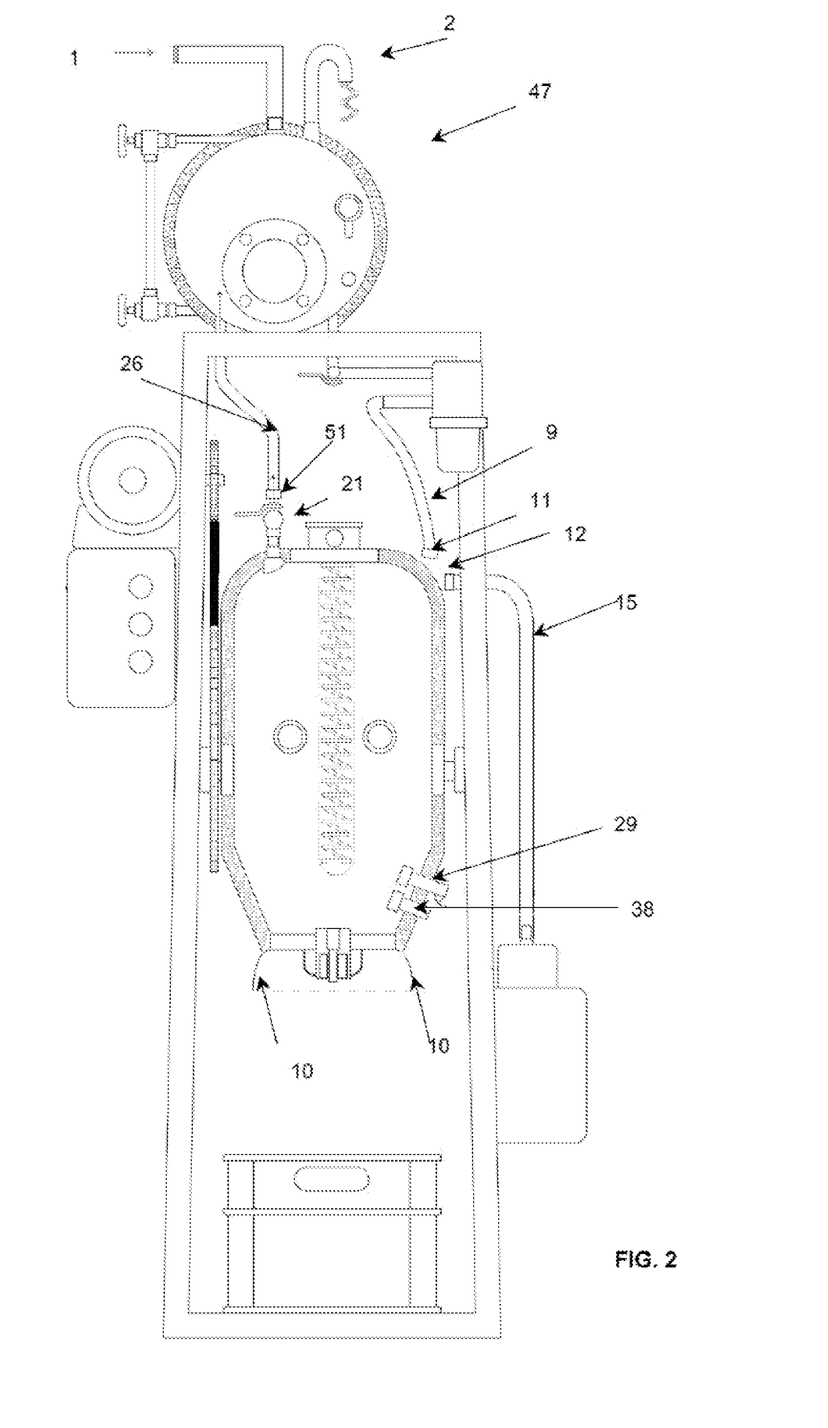
FIG. 2 shows the electromechanical nixtamalization system of the present invention in the cooking/steam-pressure outlet mode.

Once the cooking cycle is finished, the nixtamal has to be removed from the reactor (36), in FIG. 2 the reactor (36) is shown in the pressure/steam discharge position, in this step, the smaller diameter mouthpiece which corresponds to the outlet or inlet of the product is located downwards, first, the pressure outlet hose (26) is placed along with the pressure connector (51) to the steam/pressure outlet valve (21); the pressure is released into the water tank (47); the steam will condensed and at the same time the water in the water tank (47) will be heated, the steam residues that do not condense exit through the relief siphon (2).

As it may be seen in FIG. 2, the calcium hydroxide hose (9), the calcium hydroxide connector (11) and the calcium hydroxide inlet valve (38) do not comprise any connection in this step whatsoever, the same happens with the pressure hose (15), pressure connector (12) and pressure inlet valve (29) which do not comprise any connection in this step whatsoever. The position of the reactor (36) places the deflector cap (10) in position to extract the nixtamal.

Figure 3:
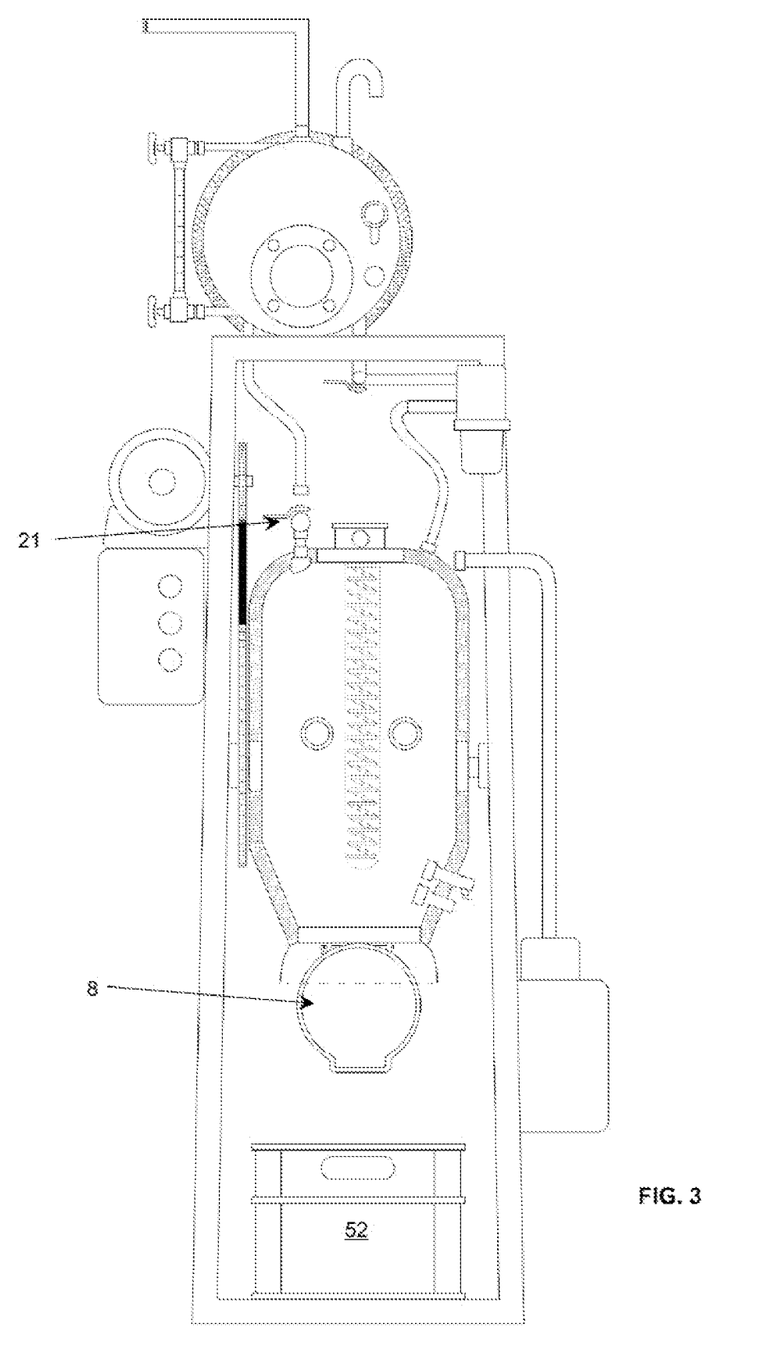
FIG. 3 shows the electromechanical nixtamalization system of the present invention in the emptying position.

Once there is no pressure in the reactor (36), the nixtamal has to be removed from the reactor (36) so that the reactor cover (8) is opened with the aid of the lever (32), in FIG. 3 the reactor (36) is shown in the nixtamal discharge position, in this step, the smaller diameter mouthpiece which corresponds to the outlet or inlet of the product is downstream, first, a container (52) is placed which receives the nixtamal for cooling same, the reactor cover (8) is opened and the nixtamal is removed from the reactor (36) by gravity.

Figure 4:
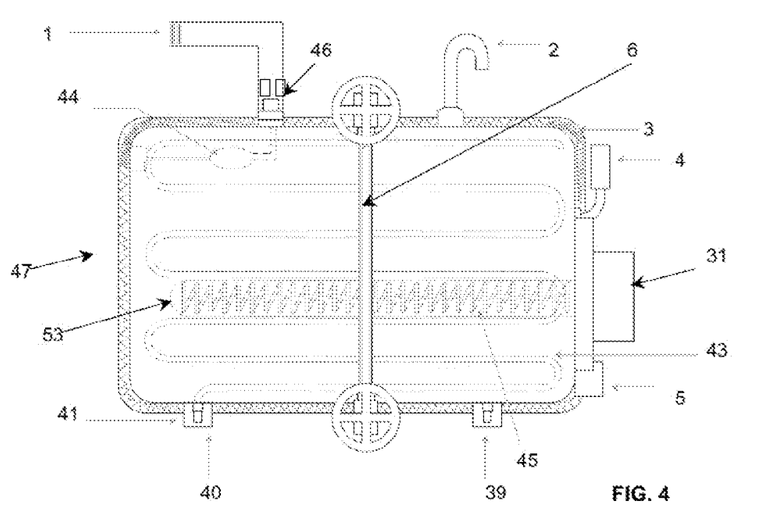
FIG. 4 shows the water tank of the present invention.

FIG. 4 shows the water tank of the present invention in a side view and showing the internal components thereof; the water tank (47) has a substantially cylindrical shape and is placed in the upper part of the reactor base, which results in the water falling by gravity to the reactor without the need for pumps. The water tank (47) comprises a water inlet by means of the hydraulic network inlet (1), a water outlet by means of the water outlet (39) and a pressure inlet by means of pressurized steam inlet (40) and the non-return valve (41); the water tank (47) is comprised by a stainless steel, heat resistant plastic, aluminum, etc., inside container; a water tank insulation layer (3) which isolates the water tank (47) thus avoiding heat losses, the material of the water tank insulation layer (3) may be, but is not limited to, of fiber of glass, mineral wool, expanded polystyrene, extruded polystyrene, phenolic resin foam, among others; a structure layer is optionally provided on the outside to provide a greater strength to the water tank (47) and keep the insulator protected. It is worth mentioning that in the present invention it is preferred to have the insulation layer and the structure layer in the water tank, however, only the container layer may be present, this embodiment is feasible, however, the energy saving is lower in this embodiment. The steam/hot pressure coming from the reactor passes through a condensing coil (43) which is preferred to be made from a material that transfers the heat to the water inside the water tank (47) such as aluminum.

The water tank (47) has a water tank resistor (45) which comprises a transfer element (46). The water tank (47) comprises a water tank resistor (45) and is mounted on a base that is attached to a water tank resistor cover (31) which is removably attached to the rest of the water tank (47); advantageously, as the water tank resistor (45) and the water tank resistor cover (47) are removable, same may be removably changed in case of failure, where it may be adapted by means of screws, threaded etc.; in the same end of the water tank resistor cover (31) there is provided a thermostat (5) which regulates the water tank resistor (45). The water tank resistor (45) runs from the water tank resistor cover (31) through the interior of the water tank (47) so that the water that will be introduced to the reactor will be hot for accelerating the cooking. The resistor comprises a transfer element (53) to the outside which is preferably made from a heat conducting material.

The water tank (47) additionally comprises a tank thermometer (4)m a thermostat (5) that regulates the water tank resistor; a relief siphon (2) is also provided so that there is no pressure inside the water tank (47) when the pressure/steam in the reactor is discharged. The water inlet to the system is carried out by means of a hydraulic network inlet (1) for filling the water tank (47). Additionally, there is a visual water level (6) which helps to know the amount of water there is in the water tank (47). Internally the water tank (47) comprises a water float (44) which mechanically closes a filling valve (46) to prevent water spillage.

Figure 5:
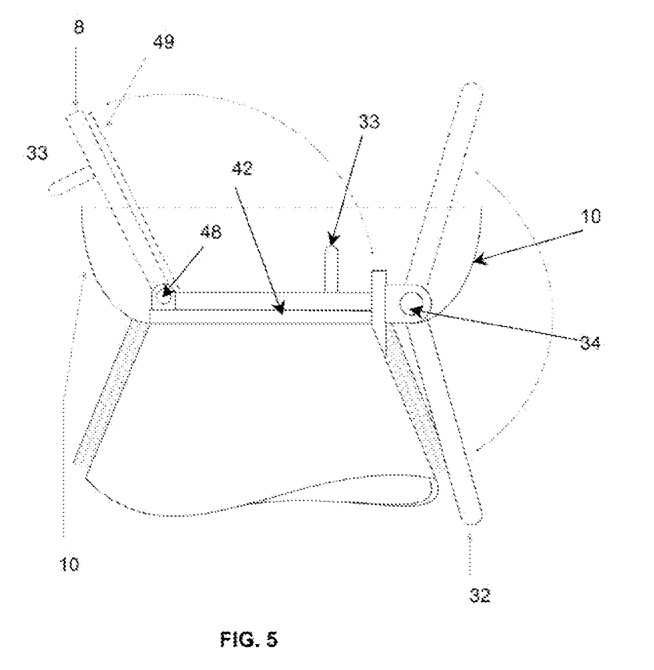
FIGS. 5 and 6 show the cover of the reactor in its opening and closing.
Figure 6:
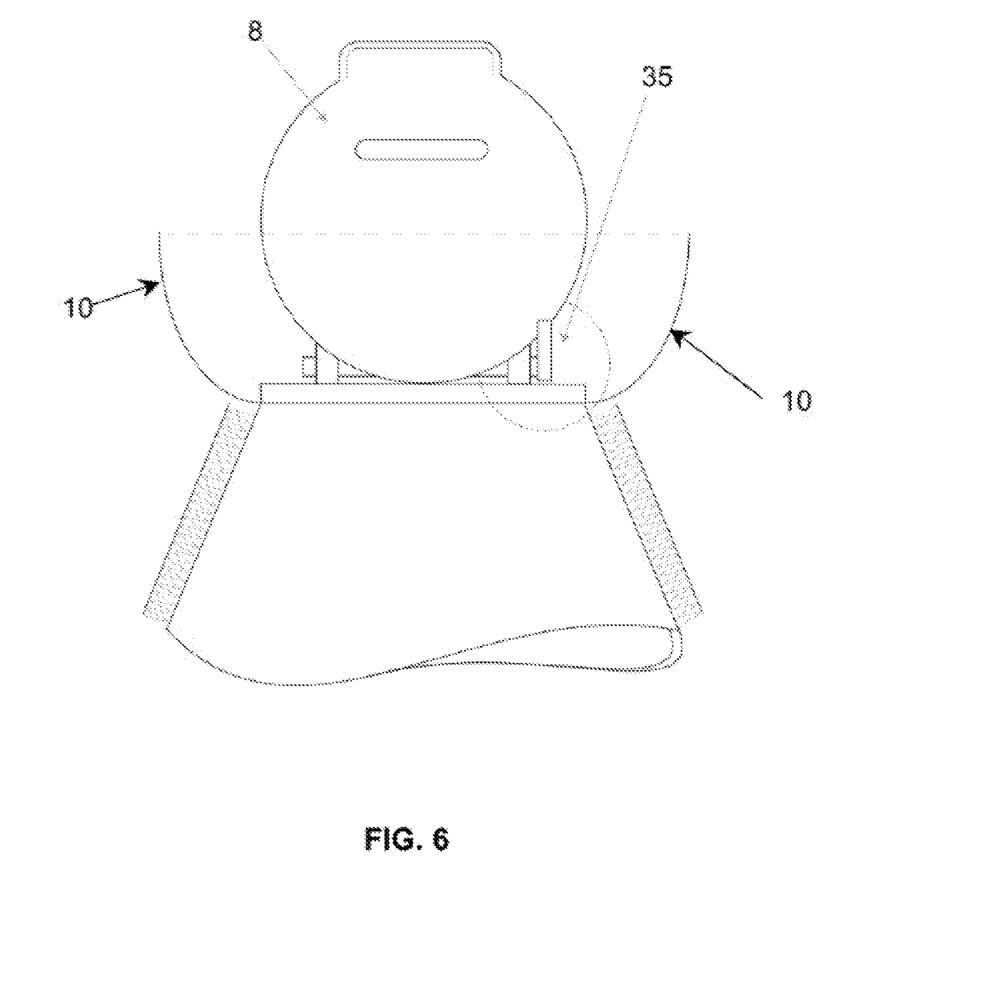

FIGS. 5 and 6 show the reactor cover (8) in its opening and closing. FIG. 5 shows the reactor cover (8) in a strong line in its closed position which comprises a lever (32)

which is hingedly moved by means of a lever hinge (34) to fix the reactor cover (8) to the mouthpiece (42) by means of a gasket (49). The reactor cover (8) is hingedly moved by means of a cover hinge (48) and the reactor cover (8) comprises a handle (33) that aids in its handling. FIG. 6 shows the reactor cover (8) and the cover latch (35) which prevents the reactor cover (8) from being opened while there is still pressure.

FIGS. 5 and 6 show the deflector cap (10) which is a sheet that surrounds the entire end, and which only allows for the movement of the lever.

Finally, the present invention refers to an electromechanical nixtamalization system, however, with the knowledge of the present invention, systems of greater or lesser size can be manufactured which would be within the scope of protection of the present invention.

THE REFERENCES ARE AS FOLLOWS hydraulic network inlet (1)
relief siphon (2)
water tank insulation layer (3)
tank thermometer (4)
thermostat (5)
visual water level (6)
lime container (7)
reactor cover (8)
calcium hydroxide hose (9)
deflector cap (10)
calcium hydroxide connector (11)
pressure connector (12)
manometer (13)
reactor insulation layer (14)
pressure hose (15)
compressor (16)
geared motor (17)
control board (18)
thermometer (19)
reactor resistor (20)
steam/pressure outlet valve (21)
reactor resistor cover (22)
reactor base (23)
transfer element (24)
primary pulley (25)
pressure outlet hose (26)
rotation shaft (27)
reactor pulley (28)
pressure inlet valve (29)
water valve (30)
water tank resistor cover (31)
lever (32)
handle (33)
lever hinge (34)
cover latch (35)
reactor (36)
bearings (37)
calcium hydroxide inlet valve (38)
water outlet (39)
pressurized steam inlet (40)
non-return valve (41)
mouthpiece (42)
condensing coil (43)
water float (44)
water tank resistor (45)
filling valve (46)
water tank (47)
cover hinge (48)
gasket (49)
belt (50)
pressure connector (51)
container (52)
transfer element (53)

The invention claimed is:

1. An electromechanical nixtamalization system comprising:
   a reactor (36) that rotates about a rotation shaft (27) comprising an inside container, a reactor insulation layer (14) and a reactor resistor (20) mounted inside the reactor, wherein the reactor is coupled to a reactor base (23) by means of bearings (37);
   a compressor (16) which introduces pressurized air by means of a pressure inlet valve (29);
   a water tank (47) in communication with a lime container (7) and which feeds the reactor by means of a calcium hydroxide inlet valve (38),
   wherein the water tank (47) comprises a pressure inlet, and
   wherein the reactor (36) has a first end comprising a mouthpiece which comprises an outlet or an inlet for a product and a second end comprising a steam/pressure outlet valve (21).

2. The electromechanical nixtamalization system of claim 1,
   wherein the first end comprising the mouthpiece further comprises a reactor cover (8) having a gasket and a closing lever.

3. The electromechanical nixtamalization system of claim 2, wherein the reactor cover (8) comprises a cover latch (35).

4. The electromechanical nixtamalization system of claim 1, wherein the water tank (47) additionally comprises a condensing coil (43) and a water float (44).

5. The electromechanical nixtamalization system of claim 1, wherein the rotation shaft (27) further comprises a reactor pulley (28) which transfers the movement from a primary pulley (25), a belt (50) and a geared motor (17).

6. The electromechanical nixtamalization system of claim 1, wherein the water tank (47) comprises a stainless steel, heat resistant plastic or aluminum inside container.

7. The electromechanical nixtamalization system of claim 1, wherein the water tank (47) has a water tank insulation layer (3) which isolates the water tank.

8. The electromechanical nixtamalization system of claim 7, wherein the material of the water tank insulation layer (3) is selected from glass fiber, mineral wool, expanded polystyrene, extruded polystyrene, or phenolic resin foam.

9. The electromechanical nixtamalization system of claim 7, wherein the water tank (47) has a structure layer to strengthen the water tank (47) and to protect the insulation layer.

10. The electromechanical nixtamalization system of claim 1, wherein the water tank includes a water outlet, and wherein the water outlet passes to a water valve (30), the lime container (7) and to a calcium hydroxide hose (9) along with a calcium hydroxide connector (11) during a filling of the reactor (36).

11. The electromechanical nixtamalization system of claim 1, further comprising a pressure outlet hose (26) communicating with the water tank pressure inlet and a pressure connector (51).

12. The electromechanical nixtamalization system of claim 1, wherein the second end further comprises a reactor resistor cover (22).

13. A method of preparing a nixtamal using the electromechanical nixtamalization system of claim 1, comprising:

loading the reactor (36) with the product through the first end comprising the mouthpiece, wherein the first end is oriented in an upward position, and wherein a calcium hydroxide hose (9) and a calcium hydroxide connector (11) communicate with a calcium hydroxide inlet valve (38) during the loading step;

cooking the product in the reactor (36) to produce the nixtamal; and removing the nixtamal from the reactor (36) through the first end comprising the mouthpiece, wherein the first end is oriented in a downward position, and wherein a pressure outlet hose (26) communicates with the steam/pressure outlet valve (21) during the step of removing the product nixtamal.

\* \* \* \* \*